US012208053B1

(12) United States Patent
Liu

(10) Patent No.: US 12,208,053 B1
(45) Date of Patent: Jan. 28, 2025

(54) MASSAGER

(71) Applicants: Dongguan Xiweier Electronic Technology Co., Ltd., Dongguan (CN); Shenzhen Yiweixing Technology Innovation Co., Ltd., Shenzhen (CN)

(72) Inventor: Qian Liu, Changde (CN)

(73) Assignees: Dongguan Xiweier Electronic Technology Co., Ltd., Dongguan (CN); Shenzhen Yiweixing Technology Innovation Co., Ltd., Shenzhen (CN)

(*) Notice: Subject to any disclaimer, the term of this patent is extended or adjusted under 35 U.S.C. 154(b) by 0 days.

(21) Appl. No.: 18/769,132

(22) Filed: Jul. 10, 2024

(30) Foreign Application Priority Data

Dec. 11, 2023 (CN) ........................ 202323364395.7

(51) Int. Cl.
*A61H 23/02* (2006.01)
*A61H 19/00* (2006.01)

(52) U.S. Cl.
CPC ......... *A61H 23/0254* (2013.01); *A61H 19/34* (2013.01); *A61H 19/44* (2013.01); *A61H 2201/1215* (2013.01); *A61H 2201/1676* (2013.01)

(58) Field of Classification Search
None
See application file for complete search history.

(56) References Cited

U.S. PATENT DOCUMENTS

| | | | | |
|---|---|---|---|---|
| 5,085,207 A * | 2/1992 | Fiore | A61H 23/0254 601/134 |
| 6,190,339 B1 * | 2/2001 | Imazaike | A61H 7/005 601/135 |
| 11,369,545 B1 * | 6/2022 | He | A61H 7/001 |
| 11,491,078 B1 * | 11/2022 | He | A61H 7/005 |
| 11,554,073 B1 * | 1/2023 | Guo | A61H 7/005 |
| 11,633,327 B1 * | 4/2023 | Wu | A61H 23/0263 601/70 |
| 11,826,300 B1 * | 11/2023 | Zhou | A61H 19/34 |
| 12,064,386 B1 * | 8/2024 | Yan | A61H 23/02 |
| 2016/0120737 A1 * | 5/2016 | Sedic | A61H 19/44 601/46 |
| 2024/0108538 A1 * | 4/2024 | Chen | A61H 23/0254 |

* cited by examiner

*Primary Examiner* — Valerie L Woodward
*Assistant Examiner* — Paige Kathleen Bugg
(74) *Attorney, Agent, or Firm* — Birchwood IP

(57) ABSTRACT

Disclosed is a massager, including a housing and a driving device. A massage rod and a massage head are arranged at an end of the housing, an extension direction of the massage rod is generally the same as that of the massage head, an extension length of the massage rod is greater than that of the massage head, a cross-sectional size of the massage rod is greater than that of the massage head, and the massage head is located on an outer side of the massage rod. The driving device is drivingly connected to the massage head. The massage head is arranged on a side of the massage rod, and both a head portion of the massage rod and the massage head located on a side of the massage rod are capable of massaging the body of a user.

18 Claims, 13 Drawing Sheets

MASSAGER

CROSS-REFERENCE TO RELATED APPLICATIONS

This application claims priority to Chinese Patent Application No. 202323364395.7, filed on Dec. 11, 2023, which is hereby incorporated by reference in its entirety.

TECHNICAL FIELD

The present disclosure relates to the technical field of massagers, and particularly relates to a massager.

BACKGROUND

With the continuous improvement of people's living standards, pace of life has generally become faster with the accordingly increasing work intensity and mental stress of people. Therefore, people have an increasing demand for body relaxation, which makes massagers popular.

A massager in the prior art usually includes a massage rod. In use, a head portion of the massage rod performs a reciprocating motion of extending and retracting to impact body parts of a user such as the waist, neck, and the like. The massage action of such a massager is relatively simple, that is, the action of vibration massage or telescopic massage is generated mainly at the head portion of the massage rod, usually without massage action in a middle portion or on a side surface of the massage rod. Therefore, the massagers in the prior art have relatively single massage functions and a non-ideal massage effect, thus bringing a relatively poor user experience.

SUMMARY

An objective of the present disclosure is to provide a massager, so as to solve at least one of the problems raised in the above Background.

In order to achieve the above objective, a massager is provided in a technical solution of the present disclosure, including:

- a housing, where a massage rod and a massage head are arranged at an end of the housing in a protruding and extending manner, an extension direction of the massage rod is generally the same as the extension direction of the massage head, an extension length of the massage rod is greater than the extension length of the massage head, a cross-sectional size of the massage rod is greater than the cross-sectional size of the massage head, and the massage head is located on an outer side of the massage rod;
- a driving device, including a driving assembly and a sliding sleeve, where the driving assembly is drivingly connected to the sliding sleeve, to drive the sliding sleeve to move along a longitudinal axis direction of the driving assembly;
- a swinging member, where a first end of the swinging member is pivotally mounted in the housing, and a second end of the swinging member extends into the massage head; and
- a swinging connecting portion, including a mouth structure and a protruded portion, where the protruded portion can be movably embedded in the mouth structure, and the swinging connecting portion is arranged between the first end of the swinging member and an outer side of the sliding sleeve, so that the driving assembly drives the sliding sleeve to slide back and forth, and through the protruded portion and the mouth structure that match each other, the second end of the swinging member is driven to swing left and right around a swinging axis, thereby achieving a massage action of the massage head relative to the massage rod.

Further, the first end of the swinging member is pivotally mounted in the housing through an shaft rotation portion, and the swinging axis of the swinging member is perpendicular to the longitudinal axis of the driving assembly; and the mouth structure is arranged on a left or right side of the first end of the swinging member, and the protruded portion is arranged on a side of the sliding sleeve.

Further, the mouth structure comprises a first convex portion and a second convex portion that are opposite to and spaced apart from each other, to form a movable cavity between the first convex portion and the second convex portion; and the protruded portion can be movably extended into the movable cavity, and during the movement of the sliding sleeve back and forth, the protruded portion abuts against the first convex portion and the second convex portion respectively to make the mouth structure move up and down reciprocally, thereby driving the swinging member to swing left and right.

Further, a mounting base is arranged on a side of the driving assembly, and the mounting base is provided with a mounting hole formed in a direction perpendicular to the longitudinal axis of the driving assembly, so that the mounting base can be inserted into the mounting hole rotatably through the shaft rotation portion so as to pivotally mount the swinging member in the housing; and an end of the shaft rotation portion away from the driving assembly is connected to the first end of the swinging member, and the mouth structure is arranged on a left or right side of an end of the shaft rotation portion close to the driving assembly.

Further, a notch is formed on a side of the mounting hole, and the swinging member, the shaft rotation portion and the mouth structure form an integrated structure, so that the shaft rotation portion can be rotatably embedded into the mounting hole through the notch.

Further, the driving assembly comprises:

- a driving motor, wherein the driving motor is arranged in the housing;
- a rotating shaft, wherein an end of the rotating shaft is drivingly connected to an output shaft of the driving motor, to drive the rotating shaft to rotate through the driving motor; and an outer periphery of the rotating shaft is provided with a closed spiral guide groove;
- a guide member, wherein the guide member can be movably extended into the closed spiral guide groove; and
- a fixed cylinder, wherein the fixed cylinder is arranged inside the housing, and the fixed cylinder is sleeved outside the rotating shaft; the sliding sleeve can be slidably sleeved on the fixed cylinder, and the guide member penetrates through the fixed cylinder and is connected to the sliding sleeve, so that when the rotating shaft rotates, the guide member moves along the closed spiral guide groove to drive the sliding sleeve to slide back and forth along the longitudinal axis of the fixed cylinder.

Further, the fixed cylinder is provided with a guide groove along its longitudinal axis direction, and the guide member penetrates through the guide groove and is connected to the sliding sleeve.

Further, a through hole is formed on a side wall of the sliding sleeve, the through hole is detachably covered by a cover body, a groove is formed at an inner side of the cover body, and the guide member, existing in the form of a ball, is arranged between the groove and the spiral guide groove.

Further, the swinging member is of a rod-bending structure that bends and extends towards a direction close to or away from the driving assembly, and an interval space is formed between the second end of the swinging member and the driving assembly.

Further, the swinging member is one of arc-shaped, C-shaped, L-shaped and S-shaped, and the massage head is of a soft rod-shaped or finger-shaped structure.

Alternatively, a massager is provided in a technical solution of the present disclosure, including:

a housing, where a massage rod and a massage head are arranged at an end of the housing in a protruding and extending manner, an extension direction of the massage rod is generally the same as the extension direction of the massage head, an extension length of the massage rod is greater than the extension length of the massage head, a cross-sectional size of the massage rod is greater than the cross-sectional size of the massage head, and the massage head is located on an outer side of the massage rod; and the driving device is drivingly connected to the massage head, so that the driving device drives the head portion of the massage head to generate a massage action relative to the massage rod.

Further, the head portion of the massage rod bends and extends in a direction roughly close to the massage head, so that an arc-shaped side wall is formed on a side of the massage rod close to the massage head; and the head portion of the massage head is arranged to be adjacent to the arc-shaped side wall, so that the massage head swings left and right on both left and right sides of the arc-shaped side wall.

Further, the massager further comprises a swinging member, and the second end of the swinging member extends into the massage head, the driving device is drivingly connected to the first end of the swinging member, so that the driving device, through the swinging member, drives the massage head to generate the massage action of swinging left and right.

Further, the driving device comprises a driving assembly and a sliding sleeve, wherein the driving assembly is drivingly connected to the sliding sleeve, to drive the sliding sleeve to move along a longitudinal axis direction of the driving assembly; a first end of the swinging member is pivotally mounted in the housing, and the swinging connecting portion is arranged between the first end of the swinging member and an outer side of the sliding sleeve, so that the driving assembly drives the sliding sleeve to slide back and forth, and through the swinging connecting portion, the second end of the swinging member is driven to swing left and right around a swinging axis.

Further, the first end of the swinging member is pivotally mounted in the housing through an shaft rotation portion, and the swinging axis of the swinging member is perpendicular to the longitudinal axis of the driving assembly; and the mouth structure is arranged on a left or right side of the first end of the swinging member, and the protruded portion is arranged on a side of the sliding sleeve.

Further, the mouth structure comprises a first convex portion and a second convex portion that are opposite to and spaced apart from each other, to form a movable cavity between the first convex portion and the second convex portion; and the protruded portion can be movably extended into the movable cavity, and during the movement of the sliding sleeve back and forth, the protruded portion abuts against the first convex portion and the second convex portion respectively to make the mouth structure move up and down reciprocally, thereby driving the swinging member to swing left and right.

Further, a mounting base is arranged on a side of the driving assembly, and the mounting base is provided with a mounting hole formed in a direction perpendicular to the longitudinal axis of the driving assembly, so that the mounting base can be inserted into the mounting hole rotatably through the shaft rotation portion so as to pivotally mount the swinging member in the housing; and an end of the shaft rotation portion away from the driving assembly is connected to the first end of the swinging member, and the mouth structure is arranged on a left or right side of an end of the shaft rotation portion close to the driving assembly.

Further, a notch is formed on a side of the mounting hole, and the swinging member, the shaft rotation portion and the mouth structure form an integrated structure, so that the shaft rotation portion can be rotatably embedded into the mounting hole through the notch.

Further, the driving assembly comprises:

a driving motor, wherein the driving motor is arranged in the housing;

a rotating shaft, wherein an end of the rotating shaft is drivingly connected to an output shaft of the driving motor, to drive the rotating shaft to rotate through the driving motor; and an outer periphery of the rotating shaft is provided with a closed spiral guide groove;

a guide member, wherein the guide member can be movably extended into the closed spiral guide groove; and a fixed cylinder, wherein the fixed cylinder is arranged inside the housing, and the fixed cylinder is sleeved outside the rotating shaft; the sliding sleeve can be slidably sleeved on the fixed cylinder, and the guide member penetrates through the fixed cylinder and is connected to the sliding sleeve, so that when the rotating shaft rotates, the guide member moves along the closed spiral guide groove to drive the sliding sleeve to slide back and forth along the longitudinal axis of the fixed cylinder.

Further, the fixed cylinder is provided with a guide groove along its longitudinal axis direction, and the guide member penetrates through the guide groove and is connected to the sliding sleeve.

It may be seen from the technical solution that in the massager of the present disclosure, the massage head is arranged on a side of the massage rod, so that the massager is capable of producing a massage action on a side surface of the massage rod, and both a head portion of the massage rod and the massage head located on a side of the massage rod are capable of massaging the body of a user, thereby enriching massage functions and modes, improving the massage effect, and offering a better comfortable experience to the user.

In order to make the technical concept and other objects, advantages, features and effects of the present disclosure clearer and more comprehensible, preferred embodiments will be specifically cited in the following specific implementation modes and described in detail in conjunction with the accompanying drawings.

BRIEF DESCRIPTION OF DRAWINGS

In order to illustrate the technical solution in embodiments of the present disclosure more clearly, the following briefly introduces accompanying drawings used in the description of the embodiments. Obviously, the accompanying drawings in the following description are only some embodiments of the present disclosure. Those of ordinary skill in the art can obtain other accompanying drawings from these accompanying drawings without any creative efforts.

Figure 1:
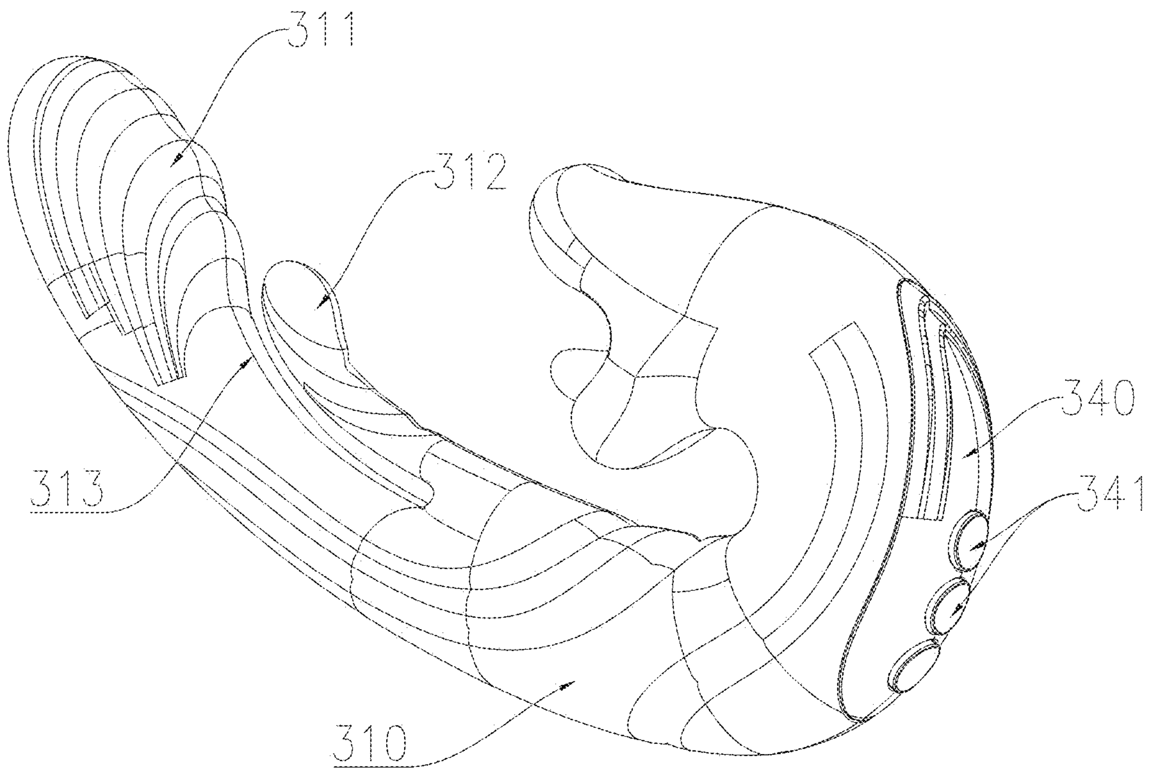
FIG. 1 is a space diagram of a massager provided in an embodiment of the present disclosure.

The above figures include the following reference numerals:

10, driving device; 100, driving assembly; 110, driving motor; 111, output shaft; 120, rotating shaft; 121, spiral guide groove; 123, shaft end; 124, insertion hole; 130, guide member; 140, fixed cylinder; 141, guide groove; 142, base; 143, shaft groove; 144, mounting base; 145, mounting hole; 146, notch; 150, sliding sleeve; 151, protruded portion; 152, through hole; 153, cover body; 154, groove;

20, swinging member; 210, first end; 220, second end; 230, shaft rotation portion; 240, mouth structure; 241, first convex portion; 242, second convex portion; 243, movable cavity; 250, interval space;

30, housing; 310, soft housing sleeve; 311, massage rod; 312, massage head; 313, arc-shaped side wall; 314, mounting opening; 320, left housing; 330, right housing; 340, tail cover; 341, button; 40, circuit board; 410, control switch; 50, lithium battery; 510, charging port; 60, motor sleeve; and 610, vibration motor.

DETAILED DESCRIPTION OF THE EMBODIMENTS

In order to make those skilled in the art better understand the technical solution of the present disclosure, the technical solution in the embodiments of the present disclosure will be clearly and completely described below with reference to accompanying drawings in the embodiments of the present disclosure. Obviously, the described embodiments are only a part of the embodiments of the present disclosure, but not all of the embodiments. Based on the embodiments of the present disclosure, all other embodiments obtained by those skilled in the art without any creative efforts fall within the protection scope of the present disclosure.

With reference to FIGS. 1-8, a massager is provided in this embodiment, including a housing 30, a driving device 10, a swinging member 20, and a swinging connecting portion. A massage rod 311 and a massage head 312 are arranged at an end of the housing 30 in a protruding and extending manner, an extension direction of the massage rod 311 is generally the same as the extension direction of the massage head 312, an extension length of the massage rod 311 is greater than the extension length of the massage head 312, a cross-sectional size of the massage rod 311 is greater than the cross-sectional size of the massage head 312, and the massage head 312 is located on an outer side of the massage rod 311. The driving device 10 includes a driving assembly 100 and a sliding sleeve 150, where the driving assembly 100 is drivingly connected to the sliding sleeve 150, to drive the sliding sleeve 150 to move along a longitudinal axis direction of the driving assembly 100. A first end 210 of the swinging member 20 is pivotally mounted in the housing 30, and a second end 220 of the swinging member 20 extends into the massage head 312. The swinging connecting portion includes a mouth structure 240 and a protruded portion 151, where the protruded portion 151 can be movably embedded in the mouth structure 240, and the swinging connecting portion is arranged between the first end 210 of the swinging member 20 and an outer side of the sliding sleeve 150, so that the driving assembly 100 drives the sliding sleeve 150 to slide back and forth, and through the protruded portion 151 and the mouth structure 240 that match each other, the second end 220 of the swinging member 20 is driven to swing left and right around a swinging axis, thereby achieving a massage action of the massage head 312 relative to the massage rod 311.

Figure 3:
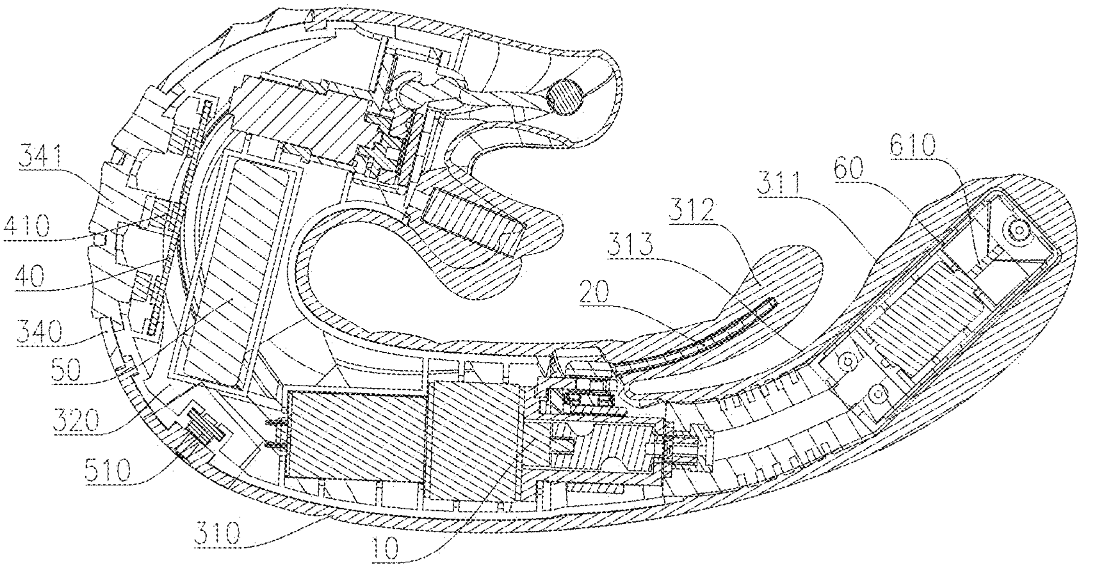
FIG. 3 is a sectional view of a massager provided in an embodiment of the present disclosure.

According to such arrangement as shown in FIGS. 1 and 3, the massage head 312 is arranged on a side of the massage rod 311, so that the massager is capable of producing a massage action on a side surface of the massage rod 311, and both a head portion of the massage rod 311 and the massage head 312 located on a side of the massage rod 311 are capable of massaging the body of a user, thereby enriching massage functions and modes, improving the massage effect, and offering a better comfortable experience to the user.

Figure 4:
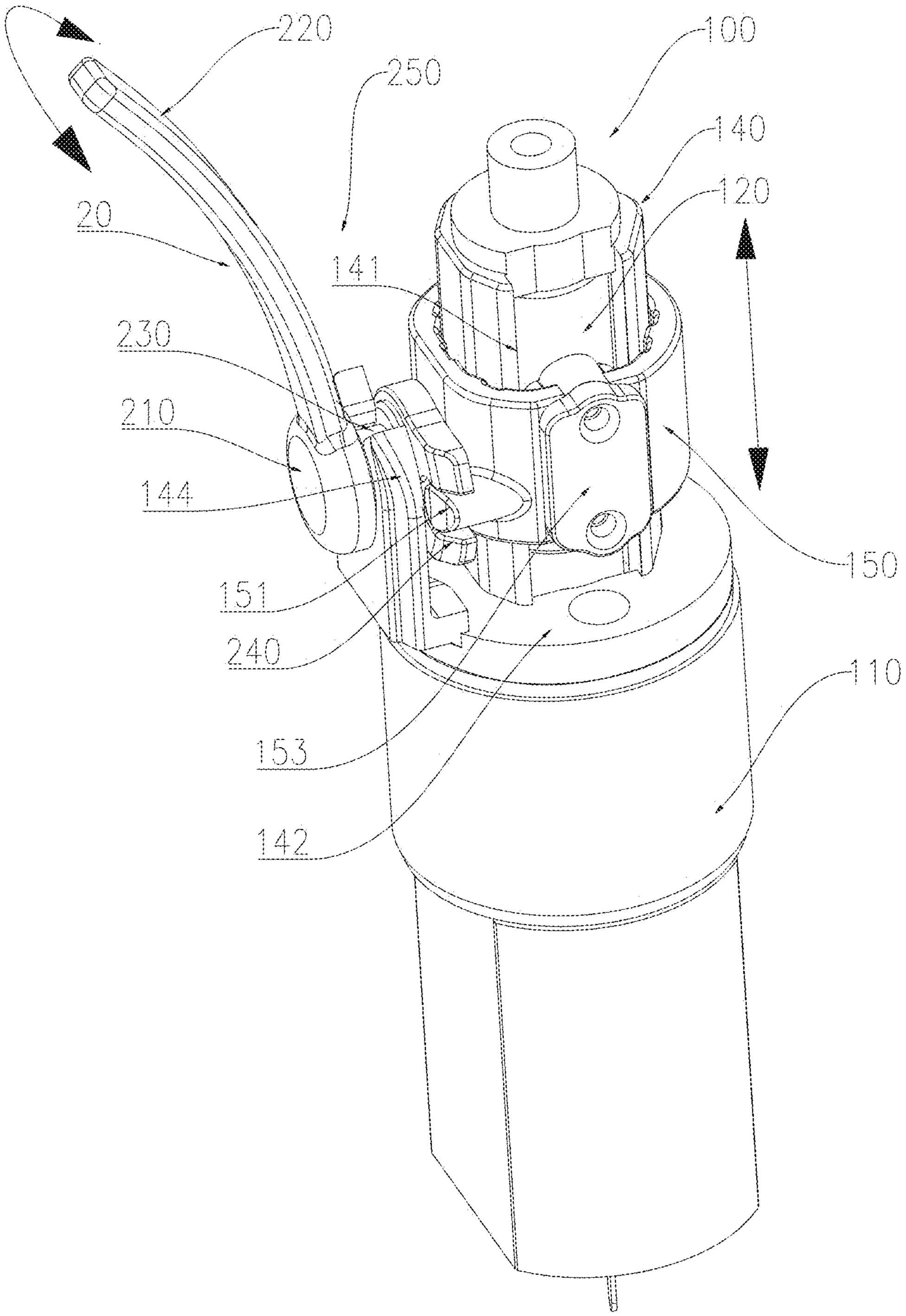
FIG. 4 is a structural schematic diagram of a combination of a driving device and a swinging member provided in an embodiment of the present disclosure.
Figure 5:
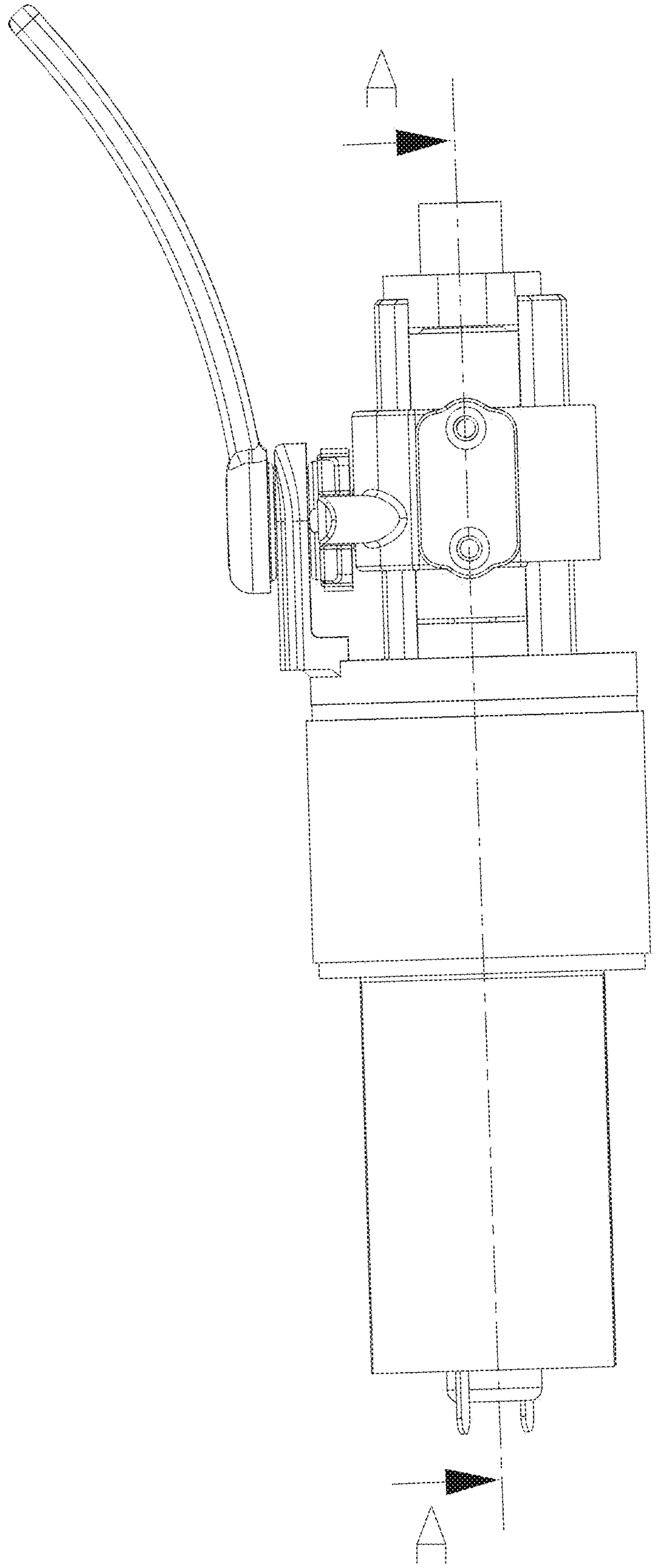
FIG. 5 is a front view of a combination of a driving device and a swinging member provided in an embodiment of the present disclosure.

In this embodiment, as shown in FIG. 4, the first end 210 of the swinging member 20 is pivotally mounted in the housing 30 through a shaft rotation portion 230, and the swinging axis of the swinging member 20 is perpendicular to the longitudinal axis of the driving assembly 100. The mouth structure 240 is arranged on a left or right side of the first end 210 of the swinging member 20, and the protruded portion 151 is arranged on a side of the sliding sleeve 150. In this way, as the sliding sleeve 150 moves back and forth, the protruded portion 151 on the sliding sleeve 150 matches the mouth structure 240 of the first end 210 of the swinging member 20, so that a back-and-forth sliding motion of the sliding sleeve 150 along the longitudinal axis of the driving assembly 100 is converted into a reciprocating swinging motion of the mouth structure 240 around the swinging axis, thereby causing the second end 220 of the swinging member 20 to swing back and forth around the swinging axis.

Figure 7:
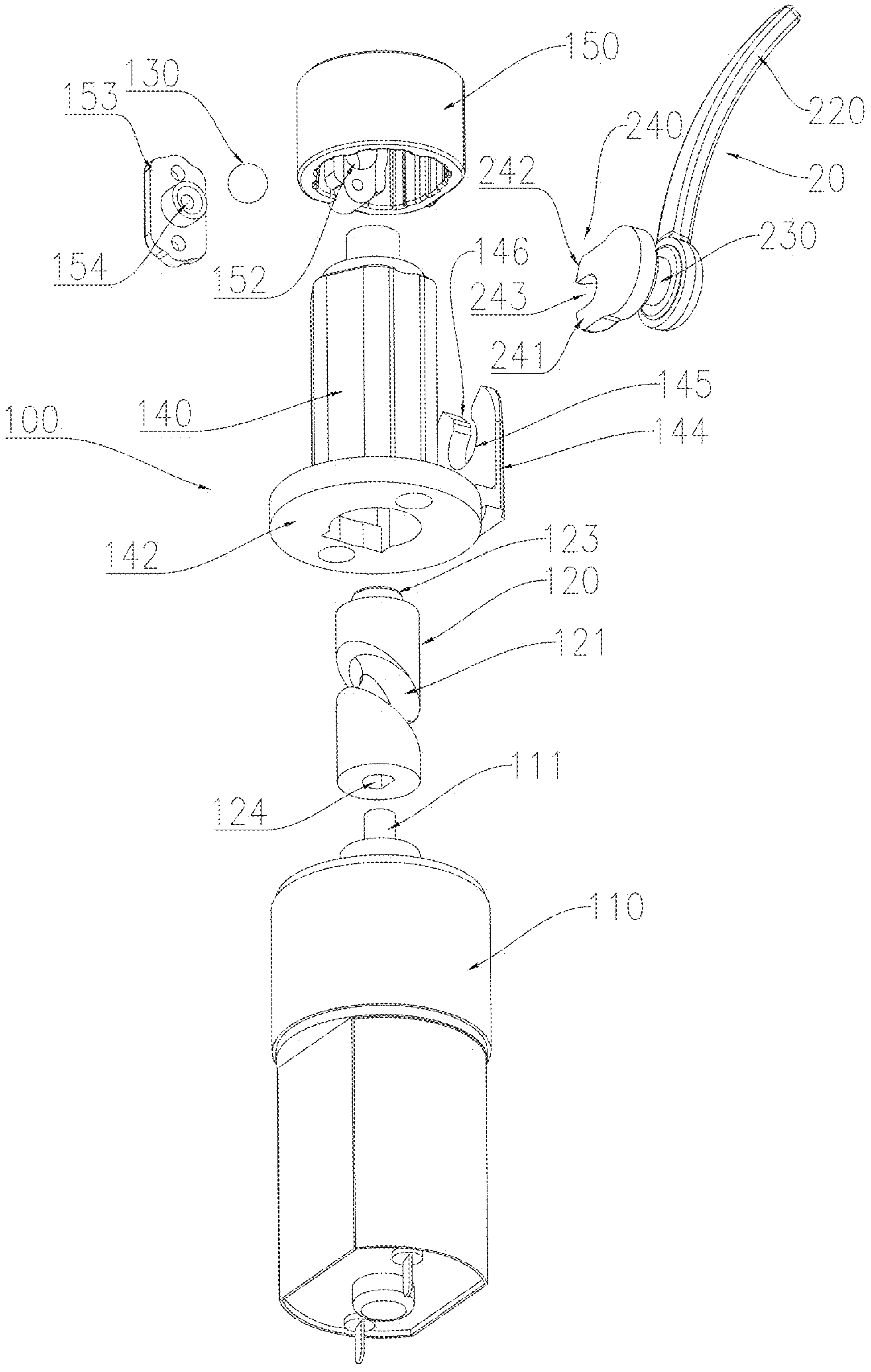
FIG. 7 is a schematic diagram of a breakdown structure of a combination of a driving device and a swinging member provided in an embodiment of the present disclosure.
Figure 8:
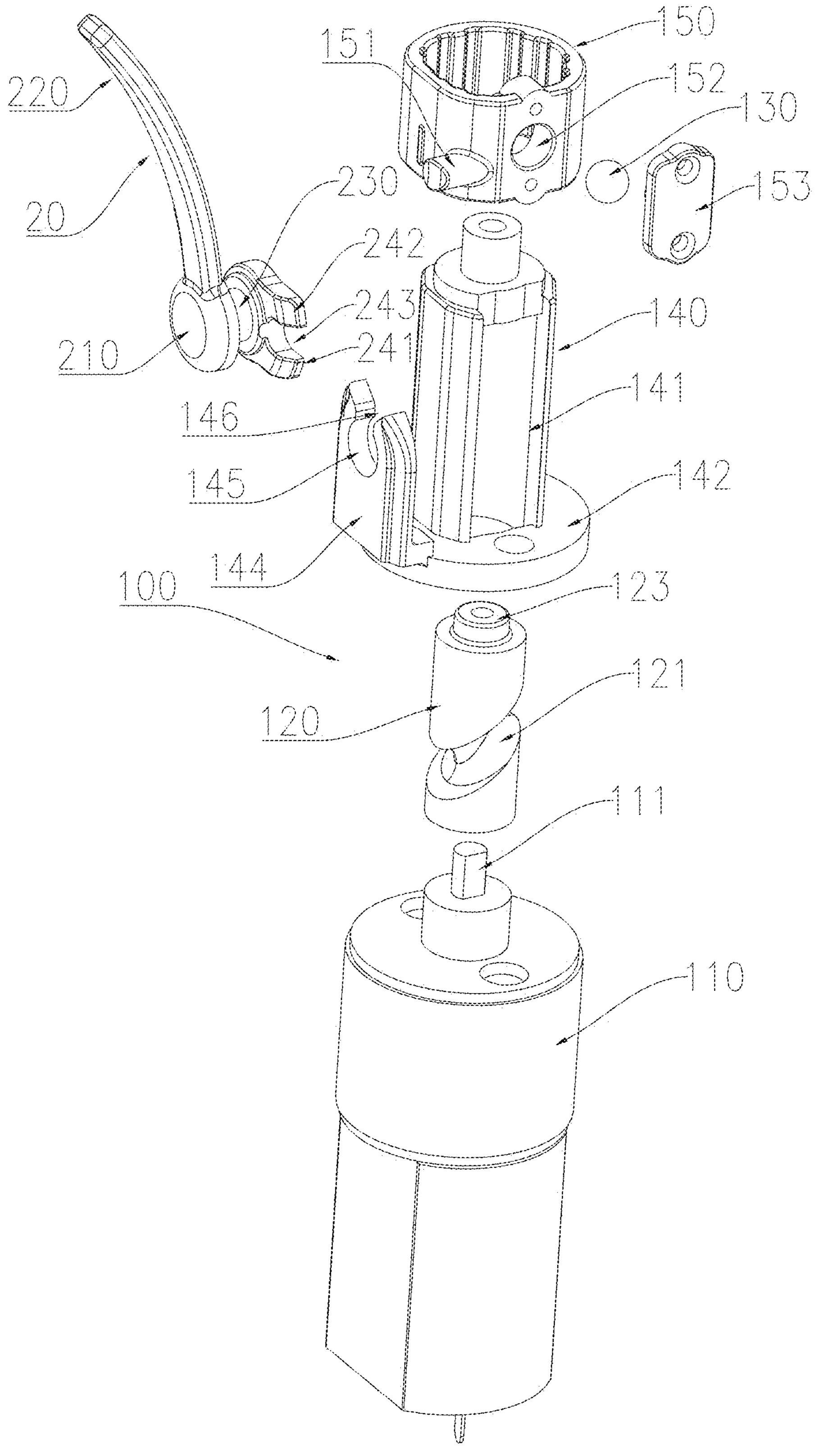
FIG. 8 is a schematic diagram of another view of a breakdown structure of a combination of a driving device and a swinging member provided in an embodiment of the present disclosure.
Figure 9A:
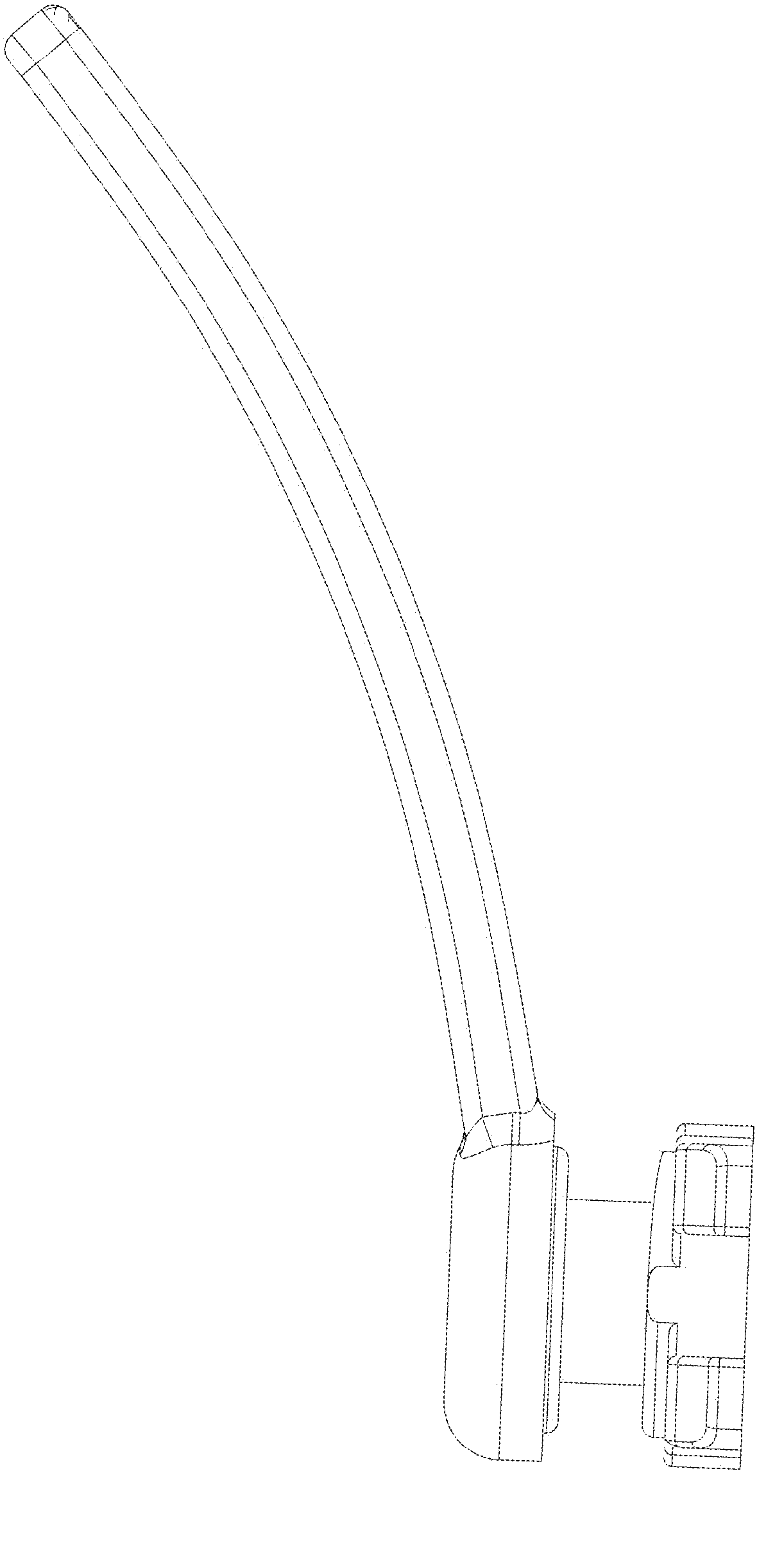
FIG. 9A is a structural schematic diagram of a swinging member according to an implementation provided in an embodiment of the present disclosure.
Figure 9B:
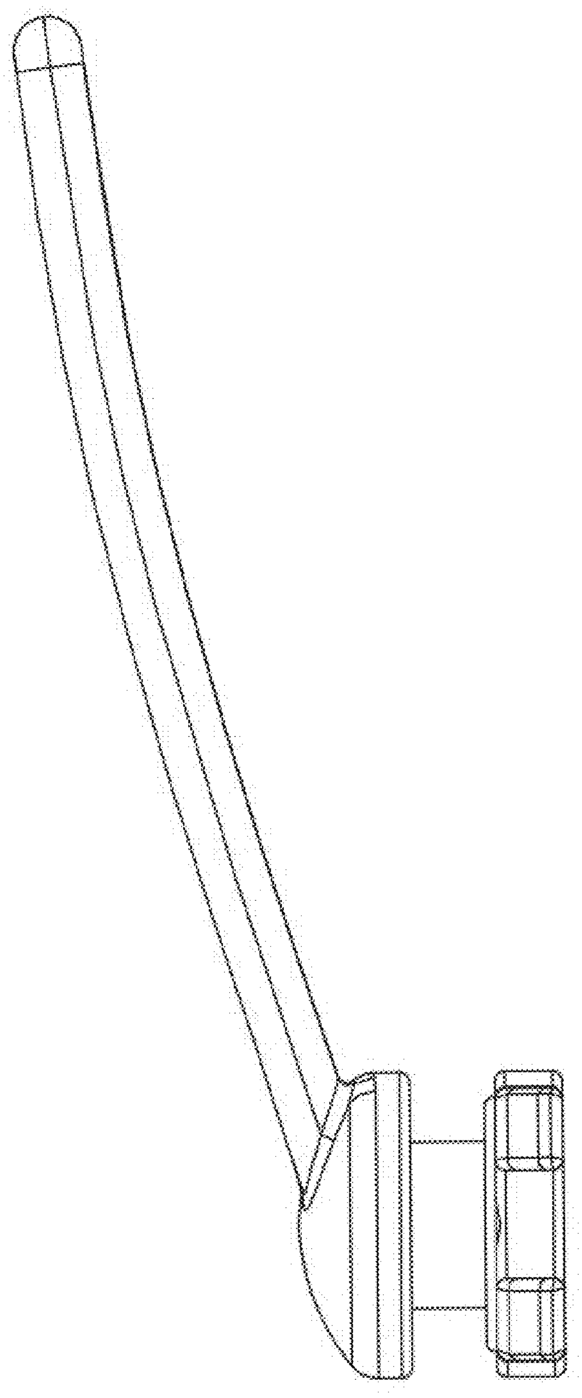
FIG. 9B is a structural schematic diagram of a swinging member according to another implementation provided in an embodiment of the present disclosure.
Figure 9C:
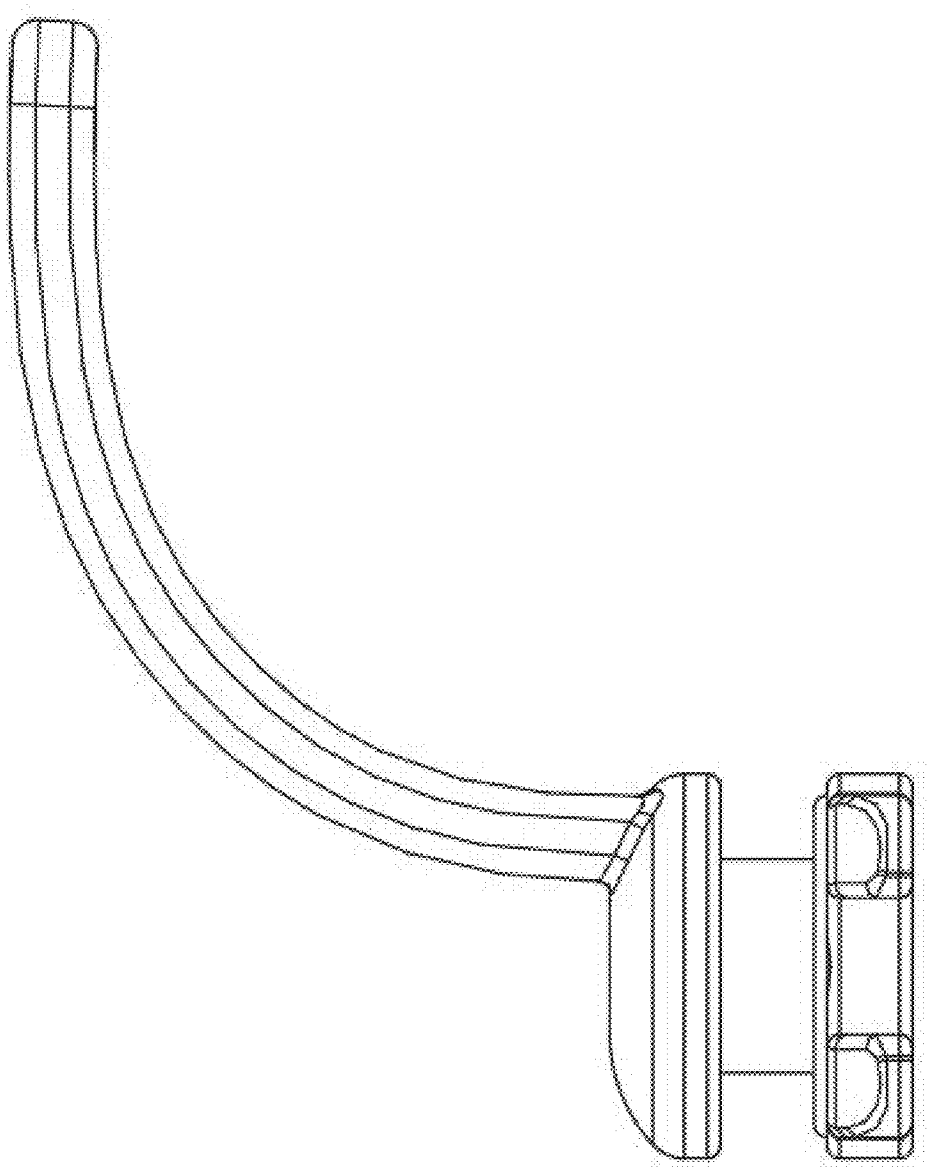
FIG. 9C is a structural schematic diagram of a swinging member according to another implementation provided in an embodiment of the present disclosure.
Figure 9D:
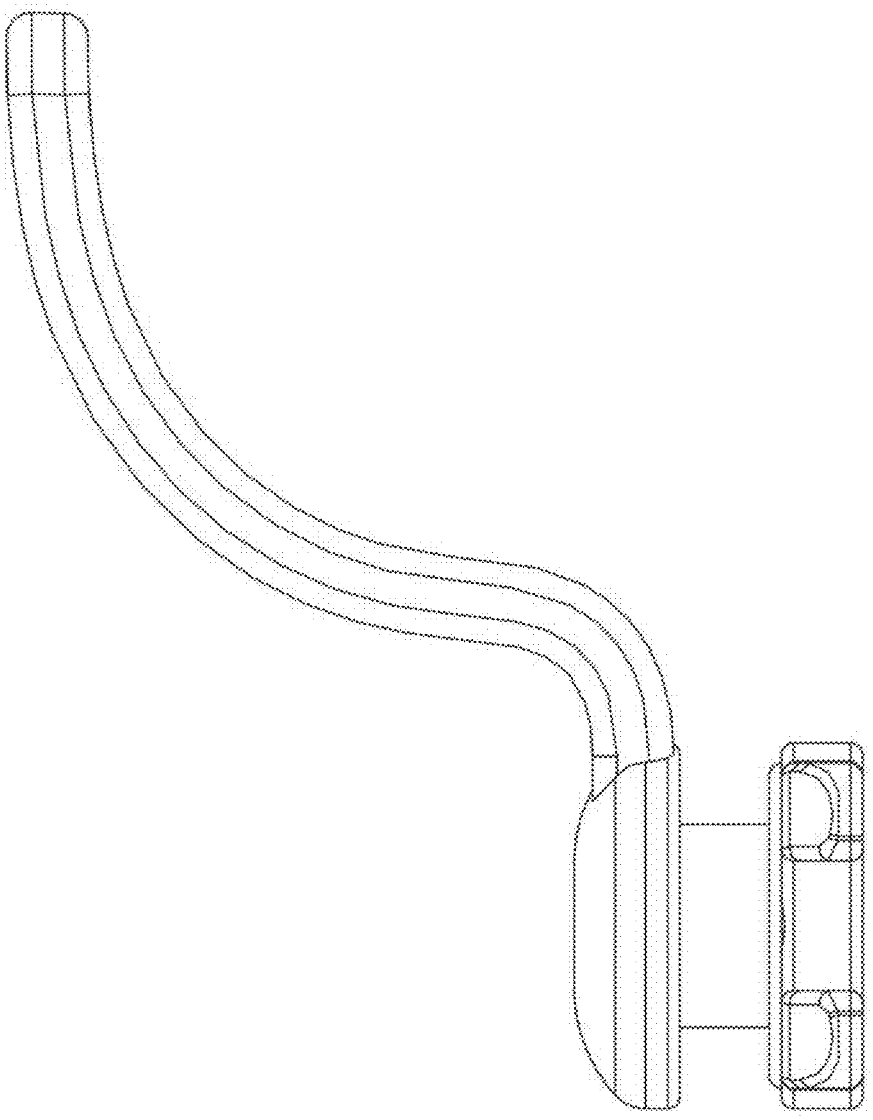
FIG. 9D is a structural schematic diagram of a swinging member according to another implementation provided in an embodiment of the present disclosure.
Figure 9E:
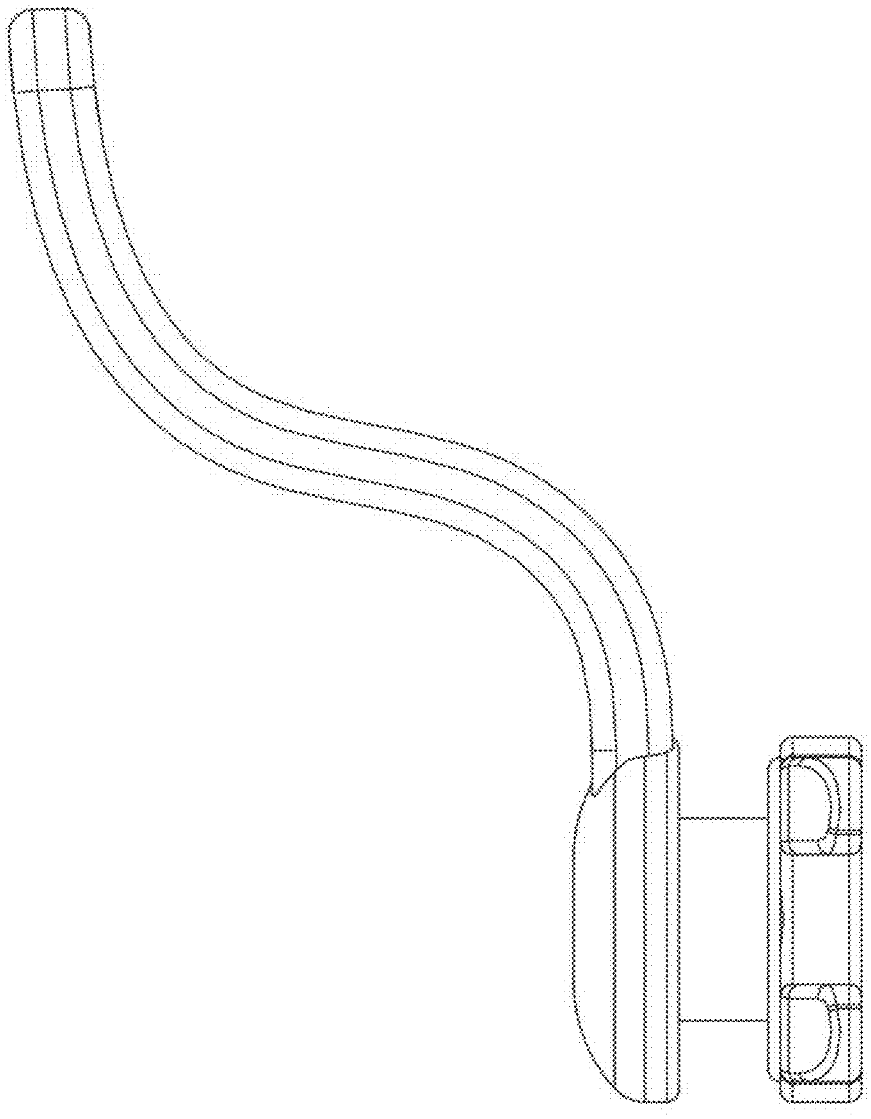
FIG. 9E is a structural schematic diagram of a swinging member according to another implementation provided in an embodiment of the present disclosure.

Specifically, as shown in FIGS. 4, 7 and 8, the mouth structure 240 includes a first convex portion 241 and a second convex portion 242 that are opposite to and spaced apart from each other, to form a movable cavity 243 between the first convex portion 241 and the second convex portion 242. The protruded portion 151 can be movably extended into the movable cavity 243, and during the movement of the sliding sleeve 150 back and forth, the protruded portion 151 abuts against the first convex portion 241 and the second convex portion 242 respectively to make the mouth structure 240 move up and down reciprocally. The mouth structure 240 is arranged at the first end 210 of the swinging member 20, so that during the reciprocating swinging motion of the mouth structure 240, the second end 220 of the swinging member 20 swings left and right around the swinging axis synchronously, thereby driving the massage head 312 to generate a massage action of swinging left and right on an outer side of the massage rod 311.

As shown in FIGS. 7 and 8, an opening is formed between opposite ends of the first convex portion 241 and the second convex portion 242 away from the shaft rotation portion 230. Through this opening, the protruded portion 151 can be easily embedded into the movable cavity 243. The protruded portion 151 is of a rod-shaped structure, a cross section of the protruded portion 151 is elliptical or waist-shaped, and the protruded portion 151 extends in a direction perpendicular to the longitudinal axis of the sliding sleeve 150.

Further, as shown in FIGS. 7 and 8, a mounting base 144 is arranged on a side of the driving assembly 100, and the mounting base 144 is provided with a mounting hole 145 formed in a direction perpendicular to the longitudinal axis of the driving assembly 100, so that the mounting base 144 can be inserted into the mounting hole 145 rotatably through the shaft rotation portion 230 so as to pivotally mount the swinging member 20 in the housing 30. Further, an end of the shaft rotation portion 230 away from the driving assembly 100 is connected to the first end 210 of the swinging member 20, and the mouth structure 240 is arranged on a left or right side of an end of the shaft rotation portion 230 close to the driving assembly 100. Both ends of the shaft rotation portion 230 are respectively provided with limiting flanges, so that the limiting flanges on the both ends of the shaft rotation portion 230 abut against two end faces of the mounting hole 145 to axially limit.

Preferably, as shown in FIGS. 7 and 8, a notch 146 is formed on a side of the mounting hole 145, and the swinging member 20, the shaft rotation portion 230 and the mouth structure 240 form an integrated structure, so that the shaft rotation portion 230 can be rotatably embedded into the mounting hole 145 through the notch 146. Such arrangement makes the structure simpler and more compact, and facilitates assembly, improving production efficiency.

In this embodiment, as shown in FIGS. 7 and 8, the driving assembly 100 includes a driving motor 110, a rotating shaft 120, a guide member 130, and a fixed cylinder 140, where the driving motor 110 is arranged inside the housing 30, and an end of the rotating shaft 120 is drivingly connected to an output shaft 111 of the driving motor 110, to drive the rotating shaft 120 to rotate through the driving motor 110. An outer periphery of the rotating shaft 120 is provided with a closed spiral guide groove 121, the guide member 130 can be movably extended into the closed spiral guide groove 121, the fixed cylinder 140 is arranged inside the housing 30, and the fixed cylinder 140 is sleeved outside the rotating shaft 120. The sliding sleeve 150 can be slidably sleeved on the fixed cylinder 140, and the guide member 130 penetrates through the fixed cylinder 140 and is connected to the sliding sleeve 150, so that when the rotating shaft 120 rotates, the guide member 130 moves along the closed spiral guide groove 121 to drive the sliding sleeve 150 to slide back and forth along the longitudinal axis of the fixed cylinder 140. Further, the protruded portion 151 matches with the mouth structure 240, to drive the swinging member 20 to swing back and forth around the swinging axis, thereby driving the massage head 312 to generate the massage action of swinging left and right on the outer side of the massage rod 311. While the massage rod 311 performs vibration massage of the body of the user, swinging massage by the massage head 312 on both left and right sides is performed, thus further enhancing the massage effect.

Figure 6:
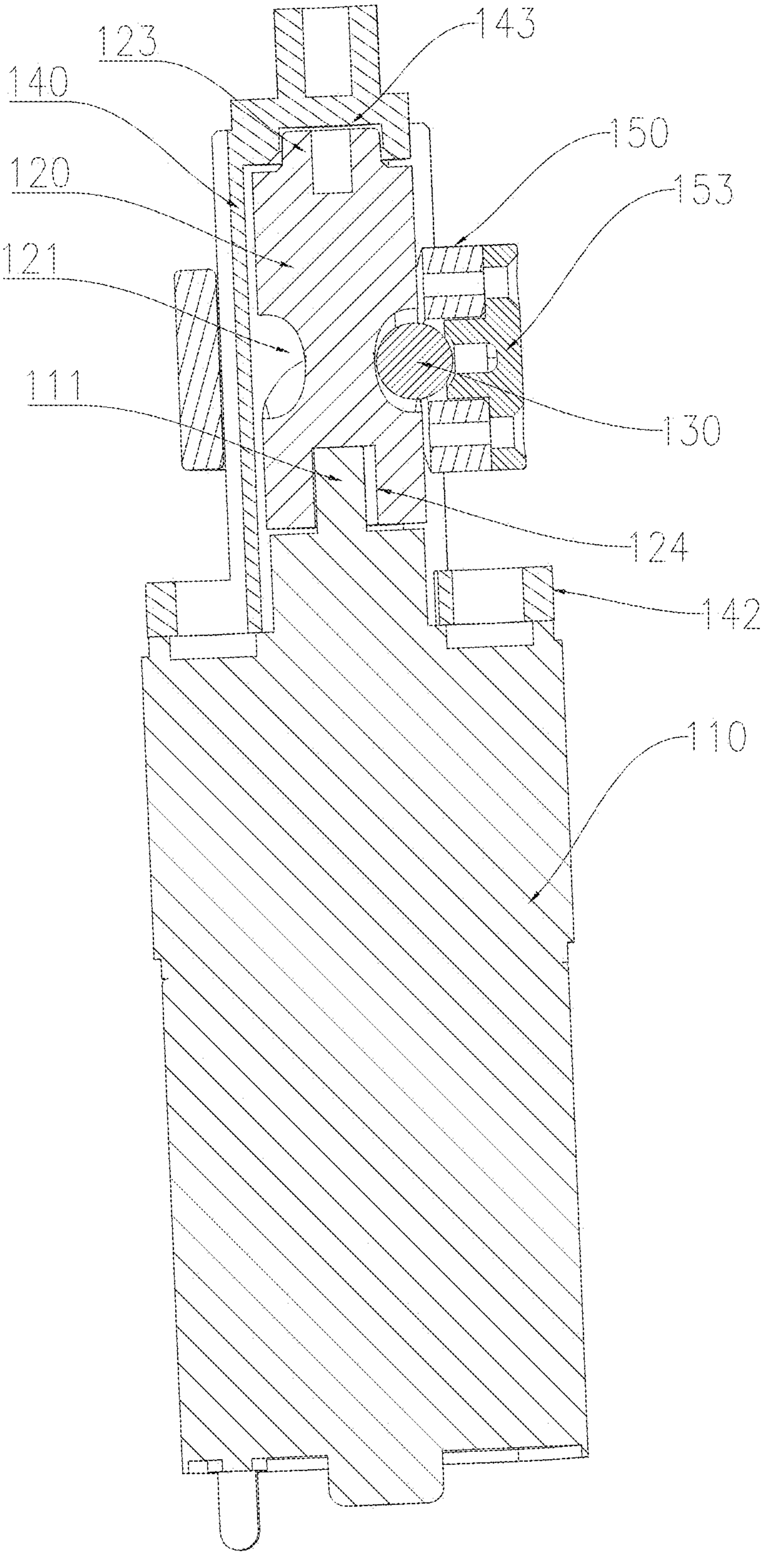
FIG. 6 is a sectional view of a section A-A in FIG. 5 provided in an embodiment of the present disclosure.

Further, as shown in FIGS. 4 and 6, the fixed cylinder 140 is provided with a guide groove 141 along its longitudinal axis direction, and the guide member 130 penetrates through the guide groove 141 and is connected to the sliding sleeve 150. A base 142 is arranged at an end of the fixed cylinder 140 facing the driving motor 110, the fixed cylinder 140 is fixedly mounted on the driving motor 110 through the base 142, the mounting base 144 is arranged on a side of the base 142, and the mounting base 144 is spaced apart from the fixed cylinder 140, to reserve enough space for the sliding sleeve 150 and the swinging connecting portion to move. In this way, the driving motor 110 drives the rotating shaft 120 to rotate, so that the guide member 130 moves along the spiral guide groove 121 and drives the sliding sleeve 150 to move back and forth along the longitudinal axis direction of the fixed cylinder 140, so as to make the second end 220 of the swinging member 20 to swing back and forth around a central axis of the shaft rotation portion 230 under the joint action of the protruded portion 151 and the mouth structure 240, thereby driving the massage head 312 to generate the massage action of swinging left and right on the outer side of the massage rod 311.

As shown in FIGS. 7 and 8, the mounting base 144 is of a vertical plate-like structure, and the swinging member 20 and the mouth structure 240 are respectively arranged at opposite ends of the shaft rotation portion 230. The mouth structure 240 is located on a side of the mounting base 144 facing the sliding sleeve 150, and the swinging member 20 is located on a side of the mounting base 144 deviating from the sliding sleeve 150, that is, the mouth structure 240 is located on an inner side of the mounting base 144 and the swinging member 20 is located on an outer side of the mounting base 144, so that when the shaft rotation portion 230 is rotatably inserted into the mounting hole 145, the protruded portion 151 on the sliding sleeve 150 can be easily embedded into the movable cavity 243 of the mouth structure 240, and enough space is reserved for the swinging member 20 to swing back and forth, thus avoiding interference between the swinging member 20 and the driving assembly 100. As a result, the structure of the present disclosure becomes simple and compact, mechanisms operate in a reliable and stable manner, and assembly thereof is more convenient.

Specifically, as shown in FIGS. 7 and 8, a through hole 152 is formed on a side wall of the sliding sleeve 150, the through hole 152 is detachably covered by a cover body 153, and the cover body 153 is mounted on the outer side of the sliding sleeve 150 by means of screws, so that the guide member 130 penetrates through the guide groove 141 through the cover body 153 and is mounted between the rotating shaft 120 and the sliding sleeve 150. A groove 154 is formed at an inner side of the cover body 153, and the guide member 130, existing in the form of a ball, is arranged between the groove 154 and the spiral guide groove 121. When the driving motor 110 drives the rotating shaft 120 to rotate, the guide member 130 drives the sliding sleeve 150 to move back and forth on the fixed cylinder 140 under the guide action of the guide groove 141. Further, a guiding structure is arranged between an outer wall of the fixed cylinder 140 and an inner wall of the sliding sleeve 150. The cross sections of the outer wall of the fixed cylinder 140 and the inner wall of the sliding sleeve 150 can be correspondingly arranged to be polygonal, and specific shapes are not limited in this embodiment, as long as an outer surface of the fixed cylinder 140 and an inner surface of the sliding sleeve 150 match each other to guide the sliding sleeve 150 to move back and forth on the fixed cylinder 140, and a relative rotation between the sliding sleeve 150 and the fixed cylinder 140 is limited. In this way, the guiding structure can guide the sliding sleeve 150 to move back and forth along the longitudinal axis direction of the fixed cylinder 140, so as to further improve the stability and reliability of the sliding sleeve 150 in operation.

Further, as shown in FIGS. 6 and 7, the driving motor 110 is a geared motor, and an insertion hole 124 is formed at one end of the rotating shaft 120, so that the output shaft 111 of the driving motor 110 is inserted into the insertion hole 124 to be drivingly connected to the rotating shaft 120. The cross section of the output shaft 111 is semi-circular, and the insertion hole 124 matches the output shaft 111 in shape, so that radial positioning is achieved to prevent the relative rotation between the output shaft 111 of the driving motor 110 and the rotating shaft 120. A shaft end 123 is arranged at the other end of the rotating shaft 120, an opening is formed at the end of the fixed cylinder 140 facing the driving motor 110, and a shaft groove 143 is formed at an end of the fixed cylinder 140 deviating from the driving motor 110, so that the other end of the rotating shaft 120 extends into the fixed cylinder 140 through the opening of the fixed cylinder 140, and the shaft end 123 is rotatably inserted into the shaft groove 143. In this way, through the joint action of the shaft end 123 and the shaft groove 143 that match each other, the driving motor 110 drives the rotating shaft 120 to smoothly rotate, thereby enhancing the stability and reliability of the mechanisms in operation.

In this embodiment, as shown in FIGS. 9A-9E, the swinging member 20 is of a rod-bending structure that bends and extends towards a direction close to or away from the driving assembly 100, and an interval space 250 is formed between the second end 220 of the swinging member 20 and the driving assembly 100. By bending and extending, the swinging member 20 enlarges the interval space 250 between the swinging member 20 and the driving assembly 100, so that the second end 220 of the swinging member 20 further deviates from the longitudinal axis of the driving assembly 100. In this way, the second end 220 of the swinging member 20 can well extend into the massage head 312 located on the side of the massage rod 311.

Preferably, as shown in FIGS. 9A-9E, the swinging member 20 is one of arc-shaped, C-shaped, L-shaped and S-shaped, the massage head 312 is of a soft rod-shaped or finger-shaped structure, and one, two, or more massage heads 312 can be arranged.

Figure 2:
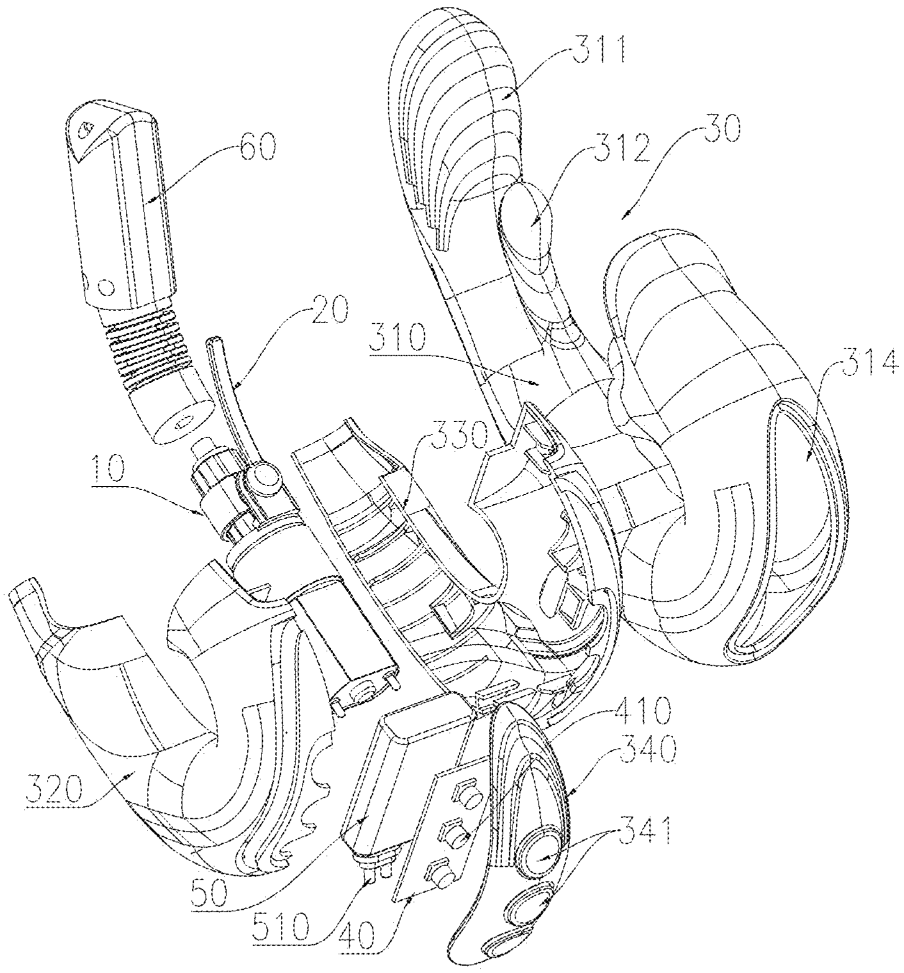
FIG. 2 is a schematic diagram of a breakdown structure of a massager provided in an embodiment of the present disclosure.

Specifically, as shown in FIGS. 2 and 3, the housing 30 includes a soft housing sleeve 310, a left housing 320, and a right housing 330, where the left housing 320 and the right housing 330 both made of plastic are buckled to each other to form an accommodating space between the left housing 320 and the right housing 330. An end of the accommodating space is arranged in an open manner, the driving device 10 is arranged in the accommodating space, and the swinging member 20 extends out of the accommodating space and extends into the massage head 312. The soft housing sleeve 310 is made of silica gel, the soft housing sleeve 310 is sleeved outside the left housing 320 and the right housing 330, and the massage rod 311 and the massage head 312 are integrally formed at an end of the soft housing sleeve 310. A motor sleeve 60 is arranged in the head portion of the massage rod 311, a vibration motor 610 is mounted in the motor sleeve 60, and the vibration motor 610 causes the head portion of the massage rod 311 to generate the action of vibration massage. A mounting opening 314 is formed in a tail portion of the soft housing sleeve 310, so that the soft housing sleeve 310 is sleeved on the left housing 320 and the right housing 330 through the mounting opening 314. The mounting opening 314 is covered with a tail cover 340, and the tail cover 340 is fixed on the left housing 320 and the right housing 330 through a buckle structure or screws.

The head portion of the massage rod 311 bends and extends in a direction roughly close to the massage head 312, so that an arc-shaped side wall 313 is formed on a side of the massage rod 311 close to the massage head 312. The head portion of the massage head 312 is arranged to be adjacent to the arc-shaped side wall 313, so that the massage head 312 swings left and right on both left and right sides of the arc-shaped side wall 313 to generate the action of body massage.

Further, as shown in FIGS. 2 and 3, the massager further includes a circuit board 40 configured for controlling the massager in operation and a lithium battery 50 configured for providing power. A charging port 510 is arranged on a side of the housing 30, so that the lithium battery 50 is charged through the charging port 510. The lithium battery 50 and the circuit board 40 are installed in the accommodating space, a plurality of control switches 410 are arranged on the circuit board 40, and a plurality of buttons 341 are arranged on the tail cover 340, where the buttons 341 and the control switches 410 are arranged correspondingly, so that the massager in operation is controlled through the buttons 341.

From the above description, it can be seen that the above-mentioned embodiments of the present disclosure achieve the following technical effects:

According to such arrangement as shown in FIGS. 1 and 3, the massage head 312 is arranged on a side of the massage rod 311, so that the massager is capable of producing a massage action on a side surface of the massage rod 311, and both a head portion of the massage rod 311 and the massage head 312 located on a side of the massage rod 311 are capable of massaging the body of a user, thereby enriching massage functions and modes, improving the massage effect, and offering a better comfortable experience to the user.

It should be understood that when an element is referred to as being "on" or "connected to" another element, it can be directly on the other element or directly connected to the other element or indirectly connected to the other element by an intervening element therebetween. On the contrary, when an element is referred to as being "directly on" or "directly connected to" another element, there are no intervening elements therebetween. Also, it should be noted that if directional indications (such as up, down, left, right, front, back, etc.) are involved in the embodiment of the present disclosure, the directional indications are only used to explain a relative position relationship, a movement condition and the like between various components under a certain posture (as shown in the accompanying drawings). If the specific posture changes, the directional indication changes accordingly.

The above are the preferred embodiments of the present disclosure. It should be noted that those skilled in the art can make several improvements and modifications without departing from the principles of the present disclosure, and these improvements and modifications may be regarded as the protection scope of the present disclosure.

What is claimed is:

1. A massager, comprising:

a housing, wherein a massage rod and a massage head are arranged at an end of the housing, an extension direction of the massage rod is generally the same as an extension direction of the massage head, an extension length of the massage rod is greater than an extension length of the massage head, a cross-sectional size of the massage rod is greater than a cross-sectional size of the massage head, and the massage head is located on an outer side of the massage rod;

a driving device, comprising a driving assembly and a sliding sleeve, wherein the driving assembly is drivingly connected to the sliding sleeve to drive the sliding sleeve to move along a longitudinal axis direction of the driving assembly, wherein the driving assembly comprises a driving motor, a rotating shaft, a guide member, and a fixed cylinder;

a swinging member, wherein a first end of the swinging member is pivotally mounted in the housing, and a second end of the swinging member extends into the massage head, wherein the swinging member is a bent rod, shaped as one of arc-shaped, C-shaped, L-shaped and S-shaped; and a swinging connecting portion, comprising a mouth structure and a protruded portion, wherein the protruded portion is movably embedded in the mouth structure, and the swinging connecting portion is arranged between the first end of the swinging member and an outer side of the sliding sleeve, so that the driving assembly drives the sliding sleeve to slide back and forth, and through the protruded portion and the mouth structure that match each other, the second end of the swinging member is driven to swing left and right around a swinging axis, thereby achieving a massage action of the massage head relative to the massage rod.

2. The massager according to claim 1, wherein the first end of the swinging member is pivotally mounted in the housing through a shaft rotation portion, and the swinging axis of the swinging member is perpendicular to the longitudinal axis direction of the driving assembly; and the mouth structure is arranged on a left side or a right side of the first end of the swinging member, and the protruded portion is arranged on a side of the sliding sleeve.

3. The massager according to claim 2, wherein the mouth structure comprises a first convex portion and a second convex portion that are opposite to and spaced apart from each other to form a movable cavity between the first convex portion and the second convex portion; and the protruded portion is movably extended into the movable cavity, and during the back and forth sliding of the sliding sleeve, the protruded portion abuts against the first convex portion and the second convex portion respectively to make the mouth structure move up and down reciprocally, thereby driving the swinging member to swing left and right.

4. The massager according to claim 2, wherein a mounting base is arranged on a side of the driving assembly, and the mounting base is provided with a mounting hole formed in a direction perpendicular to the longitudinal axis direction of the driving assembly, so that the mounting base is inserted into the mounting hole rotatably through the shaft rotation portion so as to pivotally mount the swinging member in the housing; and an end of the shaft rotation portion away from the driving assembly is connected to the first end of the swinging member, and the mouth structure is arranged on a left side or a right side of an end of the shaft rotation portion close to the driving assembly.

5. The massager according to claim 4, wherein a notch is formed on a side of the mounting hole, and the swinging member, the shaft rotation portion and the mouth structure form an integrated structure, so that the shaft rotation portion is rotatably embedded into the mounting hole through the notch.

6. The massager according to claim 1, wherein the driving motor is arranged in the housing;

an end of the rotating shaft is drivingly connected to an output shaft of the driving motor to drive the rotating shaft to rotate through the driving motor; and an outer periphery of the rotating shaft is provided with a closed spiral guide groove;

the guide member is movably extended into the closed spiral guide groove; and the fixed cylinder is arranged inside the housing, and the fixed cylinder is sleeved outside the rotating shaft; the sliding sleeve is slidably sleeved on the fixed cylinder, and the guide member penetrates through the fixed cylinder and is connected to the sliding sleeve, so that when the rotating shaft rotates, the guide member moves along the closed spiral guide groove to drive the sliding sleeve to slide back and forth along a longitudinal axis of the fixed cylinder.

7. The massager according to claim 6, wherein the fixed cylinder is provided with a guide groove along its longitudinal axis direction, and the guide member penetrates through the guide groove and is connected to the sliding sleeve.

8. The massager according to claim 7, wherein a through hole is formed on a side wall of the sliding sleeve, the through hole is detachably covered by a cover body, a groove is formed at an inner side of the cover body, and the guide member, existing in the form of a ball, is arranged between the groove and the spiral guide groove.

9. The massager according to claim 1, wherein an interval space is formed between the second end of the swinging member and the driving assembly.

10. The massager according to claim 9, wherein the massage head is of a soft rod-shaped or a finger-shaped structure.

11. A massager, comprising:

a housing, wherein a massage rod and a massage head are arranged at an end of the housing, an extension direction of the massage rod is generally the same as an extension direction of the massage head, an extension length of the massage rod is greater than an extension length of the massage head, a cross-sectional size of the massage rod is greater than a cross-sectional size of the massage head, and the massage head is located on an outer side of the massage rod; and a driving device, which is drivingly connected to the massage head, so that the driving device drives a head portion of the massage head to generate a massage action relative to the massage rod;

wherein the massager further comprises a swinging member, and a second end of the swinging member extends into the massage head, the driving device is connected to a first end of the swinging member, so that the driving device, through the swinging member, drives the massage head to generate the massage action of swinging left and right;

the driving device comprises a driving assembly and a sliding sleeve, wherein the driving assembly is connected to the sliding sleeve to drive the sliding sleeve to move along a longitudinal axis direction of the driving assembly; the first end of the swinging member is pivotally mounted in the housing, and a swinging connecting portion is arranged between the first end of the swinging member and an outer side of the sliding sleeve, so that the driving assembly drives the sliding sleeve to slide back and forth, and through the swinging connecting portion, the second end of the swinging member is driven to swing left and right around a swinging axis;

wherein the driving assembly comprises a driving motor, a rotating shaft, a guide member, and a fixed cylinder; the swinging member is a bent rod, shaped as one of arc-shaped, C-shaped, L-shaped and S-shaped.

12. The massager according to claim 11, wherein a head portion of the massage rod bends and extends in a direction close to the massage head, so that an arc-shaped side wall is formed on a side of the massage rod close to the massage head; and the head portion of the massage head is arranged to be adjacent to the arc-shaped side wall, so that the massage head swings left and right on both a left side and a right side of the arc-shaped side wall.

13. The massager according to claim 11, wherein the first end of the swinging member is pivotally mounted in the housing through a shaft rotation portion, and the swinging axis of the swinging member is perpendicular to the longitudinal axis direction of the driving assembly; and a mouth structure is arranged on a left side or a right side of the first end of the swinging member, and a protruded portion is arranged on a side of the sliding sleeve.

14. The massager according to claim 13, wherein the mouth structure comprises a first convex portion and a second convex portion that are opposite to and spaced apart from each other to form a movable cavity between the first convex portion and the second convex portion; and the protruded portion is movably extended into the movable cavity, and during the back and forth sliding of the sliding sleeve, the protruded portion abuts against the first convex portion and the second convex portion respectively to make the mouth structure move up and down reciprocally, thereby driving the swinging member to swing left and right.

15. The massager according to claim 13, wherein a mounting base is arranged on a side of the driving assembly, and the mounting base is provided with a mounting hole formed in a direction perpendicular to the longitudinal axis direction of the driving assembly, so that the mounting base is inserted into the mounting hole rotatably through the shaft rotation portion so as to pivotally mount the swinging member in the housing; and an end of the shaft rotation portion away from the driving assembly is connected to the first end of the swinging member, and the mouth structure is arranged on a left side or a right side of an end of the shaft rotation portion close to the driving assembly.

16. The massager according to claim 15, wherein a notch is formed on a side of the mounting hole, and the swinging member, the shaft rotation portion and the mouth structure form an integrated structure, so that the shaft rotation portion is rotatably embedded into the mounting hole through the notch.

17. The massager according to claim 11, wherein the driving motor is arranged in the housing;

an end of the rotating shaft is drivingly connected to an output shaft of the driving motor to drive the rotating shaft to rotate through the driving motor; and an outer periphery of the rotating shaft is provided with a closed spiral guide groove;

the guide member is movably extended into the closed spiral guide groove; and the fixed cylinder is arranged inside the housing, and the fixed cylinder is sleeved outside the rotating shaft; the sliding sleeve is slidably sleeved on the fixed cylinder, and the guide member penetrates through the fixed cylinder and is connected to the sliding sleeve, so that when the rotating shaft rotates, the guide member moves along the closed spiral guide groove to drive the sliding sleeve to slide back and forth along a longitudinal axis of the fixed cylinder.

18. The massager according to claim 17, wherein the fixed cylinder is provided with a guide groove along its longitudinal axis direction, and the guide member penetrates through the guide groove and is connected to the sliding sleeve.

* * * * *